(12) United States Patent
Zeng et al.

(10) Patent No.: US 12,461,645 B2
(45) Date of Patent: Nov. 4, 2025

(54) ADVANCED DATA DISCOVERY AND VISUALIZATION FOR ENERGY DATA SOURCES

(71) Applicant: Schlumberger Technology Corporation, Sugar Land, TX (US)

(72) Inventors: Yongdong Zeng, Houston, TX (US); Lan Lu, Houston, TX (US); Babu Sai Sampath Reddy Vinta, Houston, TX (US); Charu Hans, Houston, TX (US); Zhibin Mai, Houston, TX (US); Wenxing Qiu, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 135 days.

(21) Appl. No.: 18/553,139

(22) PCT Filed: Mar. 30, 2022

(86) PCT No.: PCT/US2022/022451
§ 371 (c)(1),
(2) Date: Sep. 28, 2023

(87) PCT Pub. No.: WO2022/212441
PCT Pub. Date: Oct. 6, 2022

(65) Prior Publication Data
US 2024/0176469 A1 May 30, 2024

Related U.S. Application Data

(60) Provisional application No. 63/168,198, filed on Mar. 30, 2021, provisional application No. 63/168,200, (Continued)

(51) Int. Cl.
*G06F 3/048* (2013.01)
*G06F 3/04817* (2022.01)
(Continued)

(52) U.S. Cl.
CPC ........ *G06F 3/0484* (2013.01); *G06F 3/04817* (2013.01); *G06F 3/0482* (2013.01); *G06F 9/451* (2018.02); *G06F 16/29* (2019.01)

(58) Field of Classification Search
None
See application file for complete search history.

(56) References Cited

U.S. PATENT DOCUMENTS 9,354,776 B1 5/2016 Subramanian
10,817,530 B2 10/2020 Siebel
(Continued)

FOREIGN PATENT DOCUMENTS

WO 2020010251 A1 1/2020
WO 2020181027 A1 9/2020

OTHER PUBLICATIONS

Chen, A. et al., "Developments in MLflow: A System to Accelerate the Machine Learning Lifecycle", 2020 in Proceedings of the Fourth International Workshop on Data Management for End-to-End Machine Learning (pp. 1-4).

(Continued)

*Primary Examiner* — Thanh T Vu
(74) *Attorney, Agent, or Firm* — Jeffrey D. Frantz

(57) ABSTRACT

A method implements advanced data discovery and visualization for energy data sources. The method includes presenting a map view displaying multiple data locations, receiving a selection identifying a subset of the map view, and selecting multiple application components corresponding to the data locations from the subset of the map view. The method further includes updating, responsive to selecting the application components, a toolbar displayed on the map view to include multiple icons corresponding to the application components. The method further includes presenting a visualization component, of the application components, displaying data, corresponding to a data location, in (Continued)

response to a selection from the toolbar. The method further includes creating, using a workflow component of the application components, a project workspace. The data presented with the visualization component is automatically imported to the project workspace.

20 Claims, 8 Drawing Sheets

Related U.S. Application Data filed on Mar. 30, 2021, provisional application No. 63/168,201, filed on Mar. 30, 2021.

(51) Int. Cl.
*G06F 3/0482* (2013.01)
*G06F 3/0484* (2022.01)
*G06F 9/451* (2018.01)
*G06F 16/29* (2019.01)

(56) References Cited

U.S. PATENT DOCUMENTS

| | | | |
|---|---|---|---|
| 11,409,756 B1 * | 8/2022 | Park | G06F 16/254 |
| 11,599,813 B1 | 3/2023 | Yuan | |
| 2009/0106178 A1 | 4/2009 | Chu | |
| 2009/0284530 A1 * | 11/2009 | Lester | G06Q 30/02 345/440 |
| 2010/0185984 A1 | 7/2010 | Wright | |
| 2014/0156806 A1 | 6/2014 | Karpistsenko | |
| 2014/0310633 A1 | 10/2014 | McLellan | |
| 2016/0210270 A1 * | 7/2016 | Kelly | G06Q 10/10 |
| 2016/0274781 A1 * | 9/2016 | Wilson | G06F 16/29 |
| 2017/0091673 A1 | 3/2017 | Gupta | |
| 2017/0178020 A1 | 6/2017 | Duggan | |
| 2017/0193392 A1 | 7/2017 | Liu | |
| 2017/0316114 A1 | 11/2017 | Bourhani | |
| 2018/0307391 A1 * | 10/2018 | Bogomolov | G06Q 50/265 |
| 2018/0349413 A1 * | 12/2018 | Shelby | G06F 16/00 |
| 2019/0066133 A1 | 2/2019 | Cotton | |
| 2019/0147297 A1 * | 5/2019 | Rogers | G06N 20/00 706/12 |
| 2019/0171428 A1 | 6/2019 | Patton | |
| 2020/0019882 A1 | 1/2020 | Garg | |
| 2020/0040719 A1 | 2/2020 | Maniar | |
| 2020/0327969 A1 | 10/2020 | Malvankar | |
| 2020/0380056 A1 | 12/2020 | Morris | |
| 2022/0300850 A1 | 9/2022 | Mendez | |
| 2024/0176732 A1 | 5/2024 | Hans | |
| 2024/0184416 A1 | 6/2024 | Zeng | |

OTHER PUBLICATIONS

"What is Amazon SageMaker ASageMaker AI", downloaded from the Internet on Dec. 25, 2024 from [https://docs.aws.amazon.com/sagemaker/latest/dg/whatis.html], 7 pages.

Dataiku Key Capabilities, downloaded from the Internet on Dec. 25, 2024 from [https://www.dataiku.com/product/key-capabilities/] 6 pages.

Hall, D.G. et al., "Users Guide Virtual Hydropower Prospector Version 1.1", Idaho National Laboratory, 2005, downloaded from the internet on Dec. 24, 2024 from [https://inldigitallibrary.inl.gov/sites/sti/sti/3488130.pdf], 38 pages.

Jing, C. et al., "Geospatial Dashboards for Monitoring Smart City Performance", Sustainability, 2019, 11(20), downloaded from the internet on Dec. 25, 2024 from [https://www.mdpi.com/2071-1050/11/20/5648/pdf], 23 pages.

Xu, H., "Development of a digitalization tool for linking thematic data to a background map", Lund University GEM thesis series nr 25, published 2017, downloaded from the internet on Dec. 25, 2024 from [https://lup.lub.lu.se/luur/downloadfunc=downloadFile recordOld=8919462 fileOld=8919470], 54 pages.

Agrawal, A. et al., "Cloudy with High Chance of DBMS: A 10-year Prediction for Enterprise-Grade ML", arXiv:1909.00084v2, Dec. 27, 2019, 8 pages.

Ames, D. P. et al., "HydroDesktop: Web services based software for hydrologic data discovery, download, visualization, and analysis", Environmental Modelling Software 37, pp. 146-156.

Zhou, L. et al., "Transfer Fuction Design based on User Selected Samples for Intuitive Multivariate Volume Exploration", IEEE Pacific Visualization Simposium, 2013, 7 pages.

Yang, W. et al., "Diagnosing Concept Drift with Visual Analytics", arXiv:2007.14372v3, Sep. 15, 2020, 12 pages.

Cashman, D. et al., "A User-based Visual Analytics Workflow for Exploratory Model Analysis", arXiv:1809.10782v3, Jul. 29, 2019, 15 pages.

Albinhassan, N. M. et al., "Porosity prediction using the group method of data handling", Geophysics, 2011, 76(5), 8 pages.

Search Report and Written Opinion of International Patent Application No. PCT/US2022/022451 dated Jun. 2, 2022, 10 pages.

Search Report and Written Opinion of International Patent Application No. PCT/US2022/022443 dated May 12, 2022, 10 pages.

Search Report and Written Opinion of International Patent Application No. PCT/US2022/022458 dated May 24, 2022, 11 pages.

Extended Search Report issued in European Patent Application No. 22782063.6 dated Jan. 8, 2025, 7 pages.

Extended Search Report issued in European Patent Application No. 22782061.0 dated Feb. 13, 2025, 7 pages.

Extended Search Report issued in European Patent Application No. 22782064.4 dated Feb. 14, 2025, 6 pages.

* cited by examiner

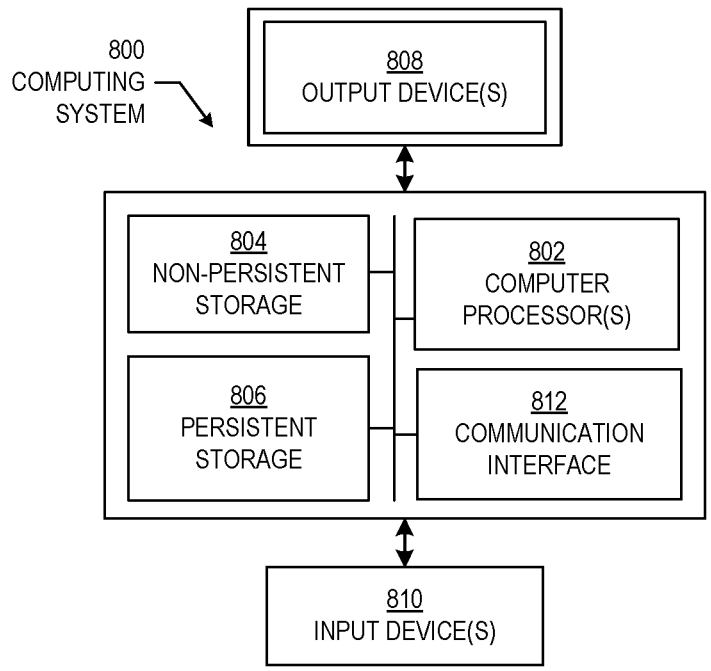
*FIG. 8.1*
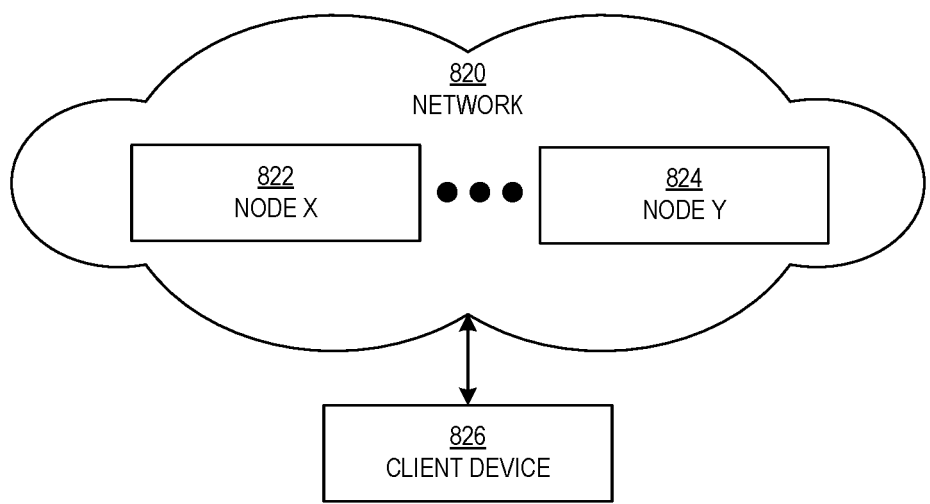
*FIG. 8.2*

ADVANCED DATA DISCOVERY AND VISUALIZATION FOR ENERGY DATA SOURCES

CROSS REFERENCE TO RELATED APPLICATIONS

This application claims the benefit of US Provisional Application 63/168,198, filed Mar. 30, 2021, of U.S. Provisional Application 63/168,200, filed Mar. 30, 2021, and of U.S. Provisional Application 63/168,201, filed Mar. 30, 2021. This application is related to US Application titled "INTEGRATED ENERGY DATA SCIENCE PLATFORM", filed Mar. 30, 2022, which claims the benefit of U.S. Provisional Application 63/168,198, filed Mar. 30, 2021, of U.S. Provisional Application 63/168,200, filed Mar. 30, 2021, and of U.S. Provisional Application 63/168,201, filed Mar. 30, 2021. This application is related to US Application titled "ADVANCED APPLICATION OF MODEL OPERATIONS IN ENERGY", filed Mar. 30, 2022, which claims the benefit of U.S. Provisional Application 63/168,198, filed Mar. 30, 2021, of U.S. Provisional Application 63/168,200, filed Mar. 30, 2021, and of U.S. Provisional Application 63/168,201, filed Mar. 30, 2021. Each of the applications above are incorporated herein by reference.

BACKGROUND

With the availability of the massive volume of data through standardized industrial data platforms, and easy access to constantly expanding cloud computing capacity, the energy industry is currently experiencing a rapid proliferation of the business intelligence and machine learning technologies. Similarly, the size of the data is exploding exponentially with the adoption of low-friction data ingestion and consumption framework. Managing the volumes of data has costs. Data discovery and data preparation may cost data scientists 80% of the data scientist's time, leaving 20% for actual data modeling and machine learning. A challenge with developing machine learning models using these systems is to identify the suitable and high quality data to use with the machine learning models.

SUMMARY

In general, in one or more aspects, the disclosure relates to a method that implements advanced data discovery and visualization for energy data sources. The method includes presenting a map view displaying multiple data locations, receiving a selection identifying a subset of the map view, and selecting multiple application components corresponding to the data locations from the subset of the map view. The method further includes updating, responsive to selecting the application components, a toolbar displayed on the map view to include multiple icons corresponding to the application components. The method further includes presenting a visualization component, of the application components, displaying data, corresponding to a data location, in response to a selection from the toolbar. The method further includes creating, using a workflow component of the application components, a project workspace. The data presented with the visualization component is automatically imported to the project workspace.

Other aspects of the invention will be apparent from the following description and the appended claims.

BRIEF DESCRIPTION OF DRAWINGS

FIG. 8.1 and FIG. 8.2 shows a computing system in accordance with one or more embodiments of the disclosure.

DETAILED DESCRIPTION

Figure 1:
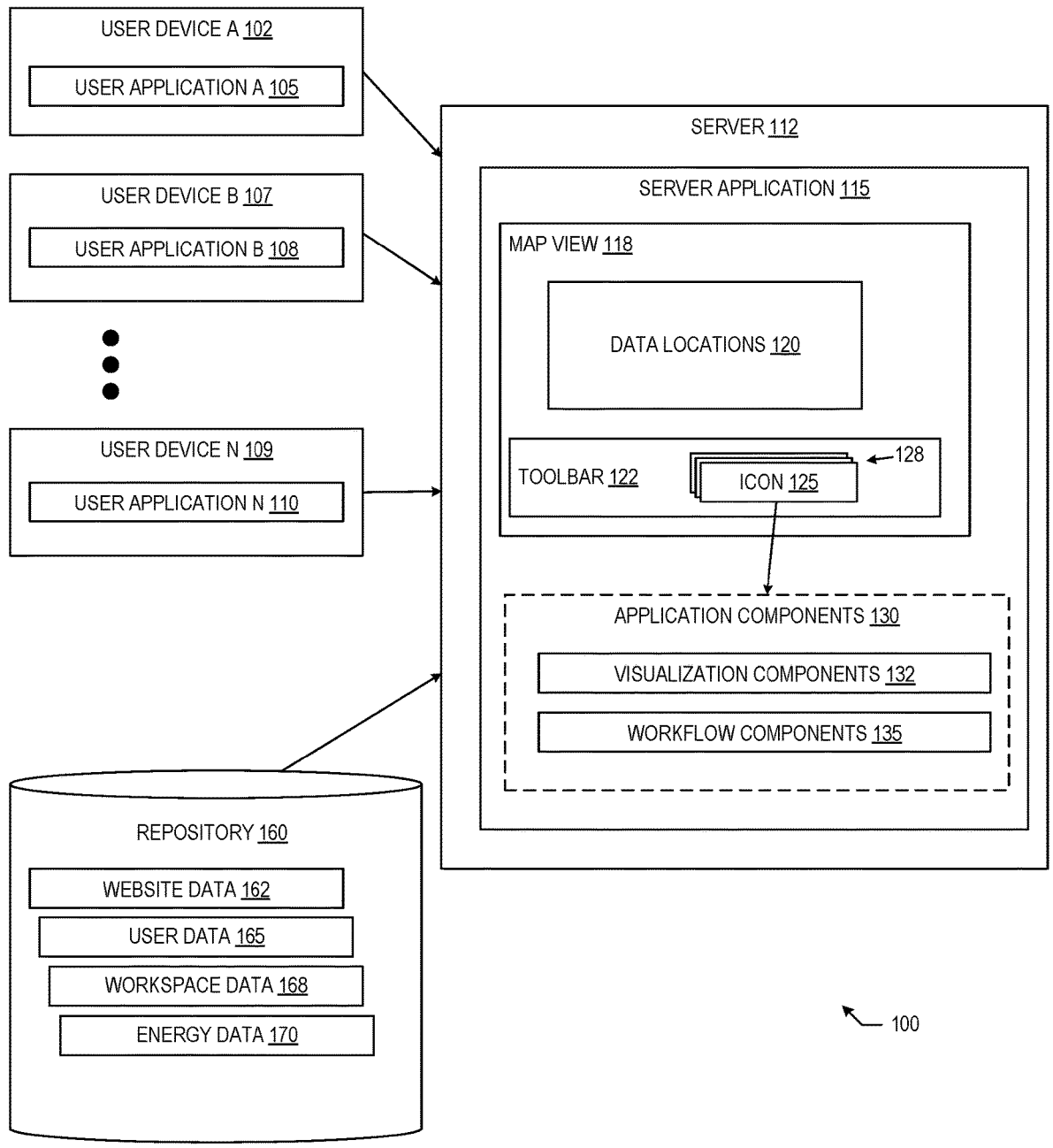
FIG. 1 shows a diagram of a computing system in accordance with one or more embodiments of the disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments according to the disclosure implement advanced data discovery and visualization for energy data sources to identify the data (e.g., energy data) to use with machine learning models. Users of the system may view a map that identifies geographical locations of the energy data that may be used with machine learning models. The map view may be context sensitive and display additional data viewers based on the type of data identified on the map. The additional data viewers may be used to view the energy data and further refine the selection of the energy data. Users may select the energy data and the system may automatically import the energy data to a data analysis project, which the user may use to develop a machine learning model to analyze the energy data.

One or more embodiments are directed to integrated solutions, operate on top of an energy data sources, to enable visual discovery of geospatial data at larger scope, and gain deeper insight into the details of the specific collated data via various smart visualization components. The efficiency of the subsequent model architecting process is drastically improved.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of data exploration and machine learning model frameworks. The various elements, systems, components, and steps shown in the figures may be omitted, repeated, combined, and/or altered as shown from the figures. Accordingly, the scope of the present disclosure should not be considered limited to the specific arrangements shown in the figures.

Turning to FIG. 1, the system (100) implements advanced data discovery and visualization for energy data sources. An example of an energy data source is Open Subsurface Data Universe™ (OSDU) framework (administered by The Open Group Limited COMPANY UNITED KINGDOM; Apex Tower, Forbury Road Reading Berkshire GREAT BRITAIN RG11AZ). Users operate the user devices A (102), B (107), and N (109) to access websites, services, etc., that may be hosted by the server (112). The server (112) hosts a platform that allows users, who are not data scientists, to locate data to be used in data analysis projects. In one embodiment, the data analysis projects include machine learning models that analyze the data located by the user. The system (100) includes the user devices A (102), B (107), and N (109), the server (112), and the repository (160).

The server (112) is a computing system (further described in FIG. 8.1). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the server application (115).

The server application (115) is a collection of programs that may execute on multiple servers of a cloud environment, including the server (112). The server application (115) presents the map view (118) with the toolbar (122) and the icons (128), which are context sensitive to the data locations (120) displayed with the map view (118). The map view (118) provides for execution of the application components (130) based on selection of one of the corresponding icons (128). In one embodiment, the server application (115) may host websites accessed by users of the user devices A (102) through N (109). The websites hosted by the server application (115) may serve structured documents (hypertext markup language (HTML) pages, extensible markup language (XML) pages, JavaScript object notation (JSON) files and messages, etc.).

The map view (118) is a view of a map that may be presented to and displayed on the user devices A (102) through N (109). In one embodiment the map view (118) includes a geographic information system (GIS) map that shows geographical locations of sources of energy data. In one embodiment, users may zoom in and select subsets of the map view to identify the data locations (120) that correspond to the data the user is interested in analyzing.

The data locations (120) are locations on the map view (118) that identify the geographical locations of the sources energy data on the map view. The geographical locations may identify the surface or projected surface locations of the sources of energy data. The energy data may include exploration data, production data, subsurface data, etc. For example, a data location may be shown on a GIS map in the map view (118) that corresponds to the geographic location of a wellsite. The data locations (120) may be shown with icons of different colors to indicate the types of energy data that correspond to the location.

The toolbar (122) is an overlay of the map view (118). The toolbar (122) displays the icons (128). In one embodiment, the toolbar (122) may pop up onto the map view (118) after the user selects a subset of the map displayed in the map view (118).

The icons (128) (including the icon (125)) are displayed on the toolbar (122). The icons (128) correspond to the application components (130). The icons (128) are shown in a context sensitive manner. An icon (of the icons (128)) corresponding to a component application (of the application components (130)) is shown when the selected subset on the map view (118) includes a data location (of the data locations (120)) that includes data that can be processed or displayed by the component application.

The application components (130) are programs that may be executed based on the types of data in the data locations (120) on the map view (118). The application components (130) include the visualization components (132) and the workflow components (135).

The visualization components (132) are programs that visualize data, identified by the data locations on the map view (118), by displaying the data. The visualization components (132) include two-dimensional viewers, three-dimensional viewers, log viewers, dashboards, etc. Two dimensional viewers display two-dimensional data and three-dimensional viewers display three-dimensional data. Log viewers display data from logs at the sites of the data locations (120). Dashboards may display analysis of the exploration and production data from the sites identified by the data locations (120). For example, a dashboard may be a business intelligence dashboard that identifies an amount of energy produced at a site.

The workflow components (135) are programs that initiate workflows for users. A workflow is a sequence of operations performed by a computer, which may be performed by a workflow component. For example, a workflow component may create a workspace for a programming project to build a machine learning model. In one embodiment, a workspace is a grouping of source code files that make up a larger unit (e.g., a web page, a website, a software program, etc.) and may include multiple files and directories. The workflow component may automatically import data identified by the data locations (120) selected with the map view (118).

The user devices A (102) and B (107) through N (109) are computing systems (further described in FIG. 8.1). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access and manipulate information, including the workspace data (168) and the energy data (170). The user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment the user applications A (105) and B (108) through N (110) include web browser programs that display web pages from the server (112). In one embodiment, the user applications A (105) and B (108) through N (110) provide graphical user interfaces that display energy data analysis software and services hosted by the system (100).

As an example, the user application A (105) may be used by a user to identify information about energy exploration and production (e.g., the energy data (170)). After identifying the energy information, the user may visualize the information (e.g., with the visualization components (132)) and execute workflows (e.g., with the workflow components (135)).

The repository (160) is a computing system that may include multiple computing devices in accordance with the computing system (800) and the nodes (822) and (824) described below in FIGS. 8.1 and 8.2. The repository (160) may be hosted by a cloud services provider that also hosts the server (112). The cloud services provider may provide hosting, virtualization, and data storage services as well as other cloud services and to operate and control the data, programs, and applications that store and retrieve data from the repository (160). The data in the repository (160) may be hosted by different databases and include the website data (162), the user data (165), the workspace data (168), and the energy data (170).

The website data (162) includes information hosted by the server (112) and presented to the user devices A (102) and B (107) through N (109). For example, the website data (162) may include HTML files that form the map view (118).

The user data (165) includes information that describes the users of the system (100). The user data (165) may include user profile information, which may include values for the username of a user and settings for a website accessed by the user through the system (100). The user data (165) may be used to identify the data, applications, and services that a user is authorized to access.

The workspace data (168) includes data and information about a workspace for a project hosted by the system (100). As an example, the workspace data (168) may include source code files for a computer programming project that analyzes information from the energy data (170). For a project, the workspace data (168) may import the energy data (170) that corresponds to the data locations (120) on the map view (118).

The energy data (170) is data that relates to data acquired or leveraged in the energy industry. In one embodiment, the energy data include data from various sensors at a target geographic location that is used for the exploration and production of energy. In one embodiment, the energy data (170) includes exploration data, production data, subsurface data, etc. The energy data (170) may include data from wells, windfarms, mines, or other sources of energy, etc.

Although shown using distributed computing architectures and systems, other architectures and systems may be used. In one embodiment, the programs described above may be part of a monolithic application executing on the server (112), or the user devices A (102) and B (107) through N (109).

Figure 2:
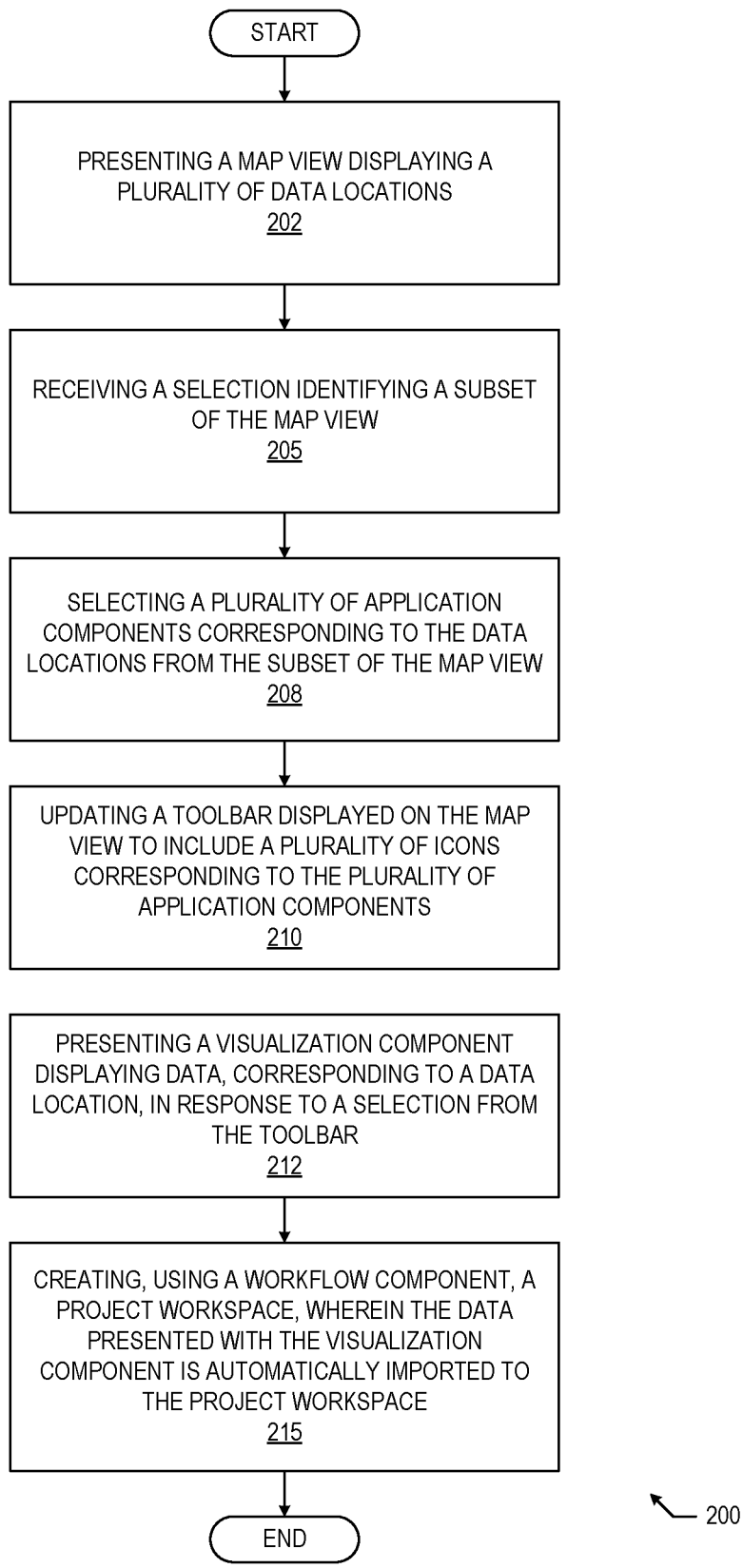
FIG. 2 shows a flowchart of a method in accordance with the disclosure.

Turning to FIG. 2, the process (200) implements advanced data discovery and visualization for energy data sources. The process (200) may be performed by a server computing system.

At Block 202, a map view is presented that displays multiple data locations. Each data location is identified with a location icon on the map view. Each data location corresponds to a set of data that is associated with a geographical location shown with the data location on the map view.

In one embodiment, the data locations are presented as a layer of the map view. The layer of data locations, also referred to as the data location layer, is a layer that displayed above the map layer. Different types of data may correspond to different data location layers that have different colors.

At Block 205, a selection is received that identifies a subset of the map view. The subset of the map view may be selected using a lasso select tool, a rectangular select tool, etc. The lasso select tool identifies the subset of the map view based on a user drawing a circle (i.e., lassoing) around the data locations that are of interest. The rectangular select tool identifies the subset of the map view based on a rectangle, defined from mouse movements of the user with respect the map view, that encompasses the data locations that are of interest.

At Block 208, application components are selected that correspond to the data locations from the subsets of the map view. Selection of the application components is context sensitive to the types of data that underlie the data locations presented on the map view. If the data locations selected from the map view do not include the type of data used by a particular application component, that particular application component may not be displayed on the toolbar.

At Block 210, a toolbar displayed on the map view is updated to include icons that correspond to the application components. In one embodiment, the icons on the toolbar are updated to include an icon of a workflow component. In one embodiment, the workflow component is used to create a project workspace for a machine learning model.

In one embodiment, the icons of the toolbar are updated to include an icon of a dashboard. The dashboard may be a business intelligence dashboard that displays information using the data at the data locations identified in the map view. For example, a dashboard may show a graph that displays an amount of energy production (barrels of oil, kilowatt hours of solar energy, kilowatt hours of wind energy, etc.) over time as well as costs and profits for energy production.

At Block 212, a visualization component, of the application components, is presented to display data, corresponding to a data location, in response to a selection from the tool bar. The visualization component may be a log viewer, a two-dimensional viewer, a three-dimensional viewer, etc.

In one embodiment, a portion of the data may be selected utilizing the visualization component. For example, the visualization component may include a selection menu that identifies different subsets of the data. As an example, when the data locations selected from the map view correspond to multiple well sites, a checkbox may be included for each well site to identify whether data from that well site should be included in the visualization.

At Block 215, a project workspace is created using a workflow component. The data presented with the visualization component is automatically imported to the project workspace. The data presented with the visualization component was selected from the map view. The workflow composer may be selected from the toolbar. In one embodiment, the project workspace is configured to train and execute a machine learning model using the data presented with the domain view and the map view.

In one embodiment, the workflow component may be executed in response to selection of a button presented with the visualization component. Presenting the button for the workflow component with the visualization component provides for seamlessly transitioning from the visualization component, where the data can be viewed, to the workflow component, where the project for further analyzing the data may be created.

In one embodiment, the project workspace is created by updating a source code file to identify the data. For example, a source code file may include import statements to make a programming object that represents the data accessible to the commands, objects, functions, and programs for the project workspace. In one embodiment, source code files may be updated to include functions and programming objects that access the data identified by data locations displayed on the map view.

Figure 3:
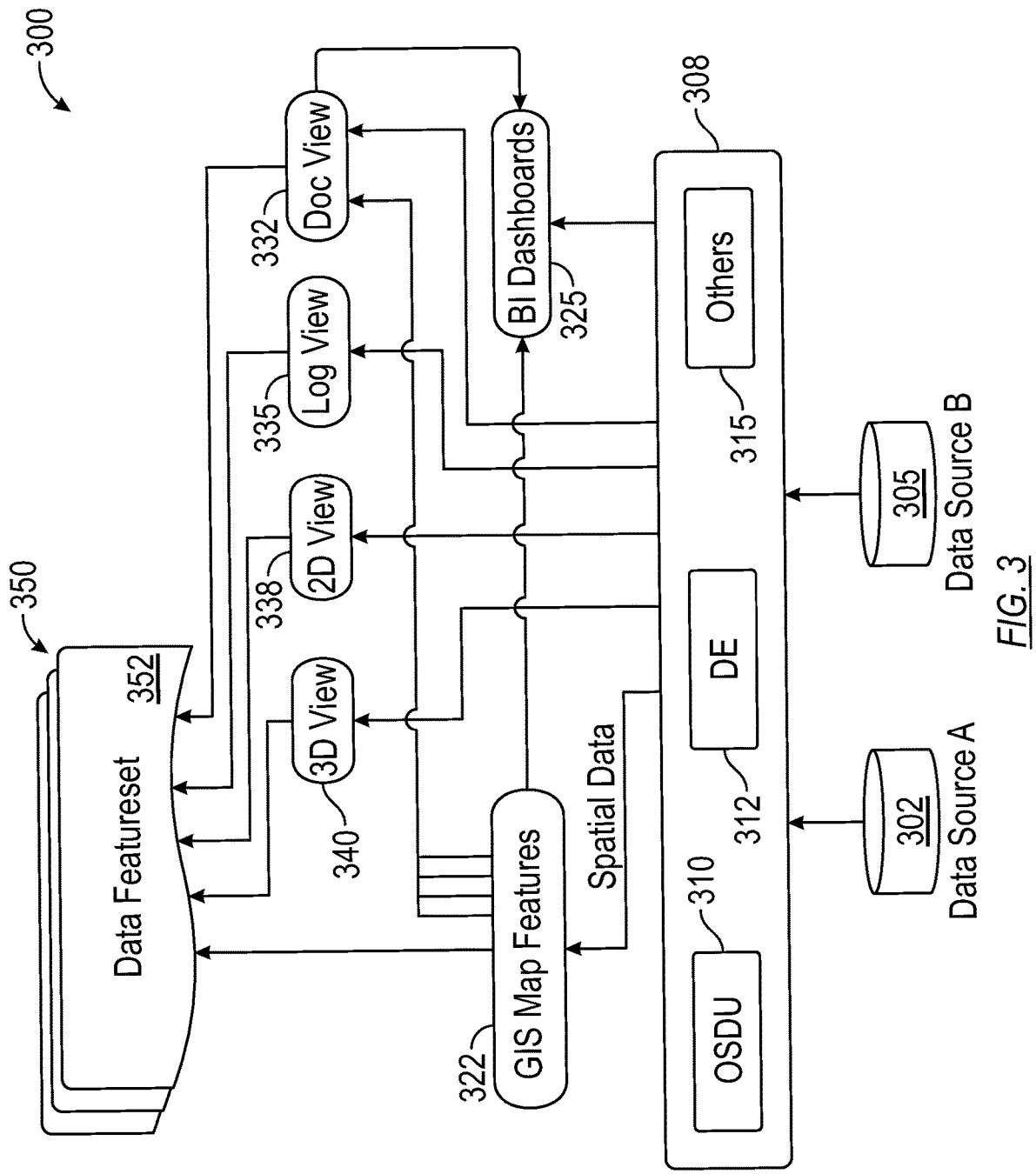
FIG. 3 shows a diagram of a computing system incorporated into the data discovery flow in accordance with one or more embodiments of the disclosure.

Turning to FIG. 3, the system (300) implements advanced data discovery and visualization for energy data sources. Data from the data sources A (302) and B (305) is viewed and located using the system (300). FIG. 3 shows diagram of an energy data system incorporated into the data discovery flow. The technique in FIG. 3 has been deployed on top of the standard industry data platforms such as the OSDU but not limited to it. It can also be used to operate on other energy data sources.

The data sources A (302) and B (305) are sources of energy data. For example, data source A (302) may provide energy data generated by well sites and the data source B (305) may provide energy data provided by renewable energy sources. Data from the data sources A (302) and B (305) are exposed by the platforms (308).

The platforms (308) provide access to data from the data sources A (302) and B (305). The platforms (308) include the OSDU (open subsurface data universe) platform (310), the data ecosystem (DE) platform (312), and other platforms (315). Different platforms may provide a different APIs application programming interfaces (APIs) for accessing the data sources A (302) and B (305). The platforms (308) provide data to the GIS (geographic information system) map features (322), the BI (business intelligence) dashboards (325), the 3D view (340), the 2D view (338), the log view (335), and the doc view (332).

The GIS map features (322) are the location features for the data from the data sources A (302) and B (305). The location features are the surface locations that identify the geographical location (e.g., longitude and latitude coordinates) of the data from the data sources A (302) and B (305). In one embodiment, system (300) retrieves spatial data using the platforms (308) to generate the GIS map features (322). The system (300) provides the GIS map features (322) to the data feature sets (350), the 3D view (340), the 2D view (338), the log view (335), the doc view (332), and the BI dashboards (325).

The BI dashboards (325) consume and display the data processed by the system. Data displayed by the BI dashboards (325) includes data from the platforms (308), the GIS map features (322), and the doc view (332).

The doc view (332) provides a document view of data from the system (300). For example, the doc view (332) display data from the data sources A (302) and B (305), accessed through the platforms (308), with data from the GIS map features (322) in a document. Documents may include spreadsheets, log files, word processor files, etc.

The log view (335) provides views of logs. The views of the logs show data from the data sources A (302) and B (305) accessed through the platforms (308).

The 2D view (338) provides two-dimensional views. The two-dimensional views show data from the data sources A (302) and B (305) accessed through the platforms (308). The two-dimensional views may show surface data, subsurface data, combinations thereof, etc.

The 3D view (340) provides three-dimensional views. The three-dimensional views show data from the data sources A (302) and B (305) accessed through the platforms (308). The three-dimensional views may show surface data, subsurface data, combinations thereof, etc.

The data feature sets (350) (including the data feature set (352)) are sets of features extracted from the data sources A (302) and B (305). Different data feature sets (350) may be used in different project workspaces.

Figure 4:
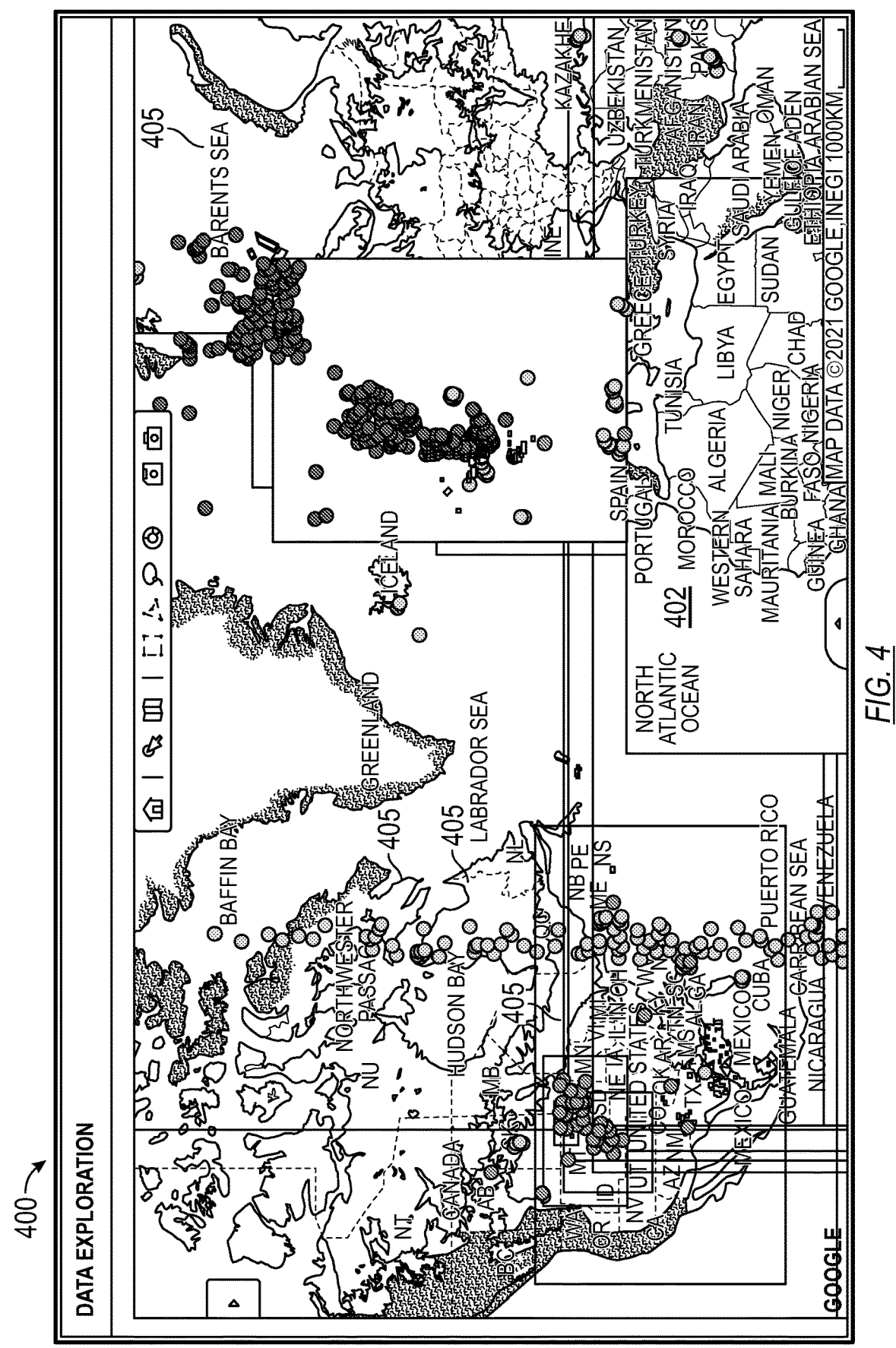
FIG. 4 shows a geographic information system (GIS) map used for machine learning data discovery in accordance with one or more embodiments of the disclosure.

Turning to FIG. 4 the GIS map (402) is used for machine learning data discovery. The GIS map (402) is displayed in the user interface (400) with the data locations (405). Upon connecting to the data platform, a geographic information system (the GIS map (402)) is presented with a default set of layers with various kinds of geospatial data from the underlying data layer. Energy domain data such as wells, pipelines, trajectories and culture data, are represented on the map as points, lines and polygons (referred to as the data locations (405)).

Layer and shape manipulation tools are available as part of the GIS map view to further filter the data or configure additional layers on the GIS canvas. Users can use different selection tools (lasso, rectangular etc.) to zoom into the subsets of data for data modeling.

Figure 5:
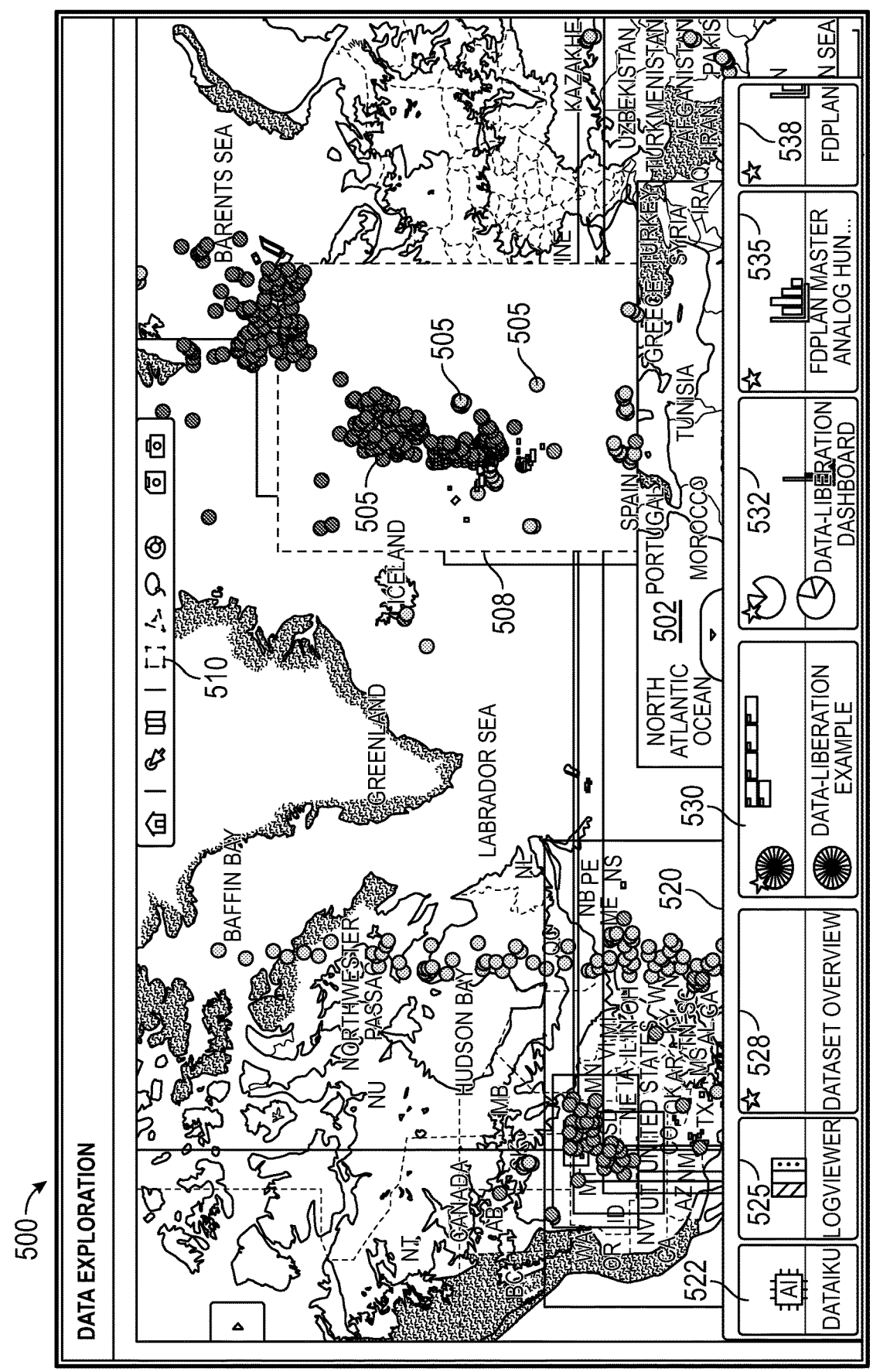
FIG. 5 shows a diagram of visualization components and workflow recommendation algorithm in accordance with one or more embodiments of the disclosure.

Turning to FIG. 5, the GIS map (502) is displayed in the user interface (500) with the data locations (505). The subset (508) of the GIS map (502) is selected with a rectangular select tool (activated by selecting the icon (510). The subset (508) includes a selected subset of the data locations (505) that are within the rectangle defined by the subset (508). The toolbar (520) displays the icons (522) through (538) for workflow components and visualization components.

The icons (528), (530), (532), (535), and (538) correspond to additional visualization components. The visualization components corresponding to the icons (528), (530), (532), (535), and (538) may be displayed as part of a dashboard. The dashboard may display various graphs with results calculated from data corresponding to at least one of the data locations (505) from the subsets (508).

The icon (525) corresponds to a visualization component, which is a log viewer. Selecting (i.e., clicking on) the icon (525) loads a log viewer that displays data corresponding to at least one of the data locations (505) from the subset (508). The log viewer is further described at FIG. 6.

The icon (522) corresponds to a workflow component used to create machine learning models. Selecting the icon (522) initiates a program that creates a project workspace that automatically imports data corresponding to at least one of the data locations (505) from the subset (508). The workflow component is further described at FIG. 7.

FIG. 5 shows a diagram of visualization components and workflow recommendation algorithm. When a data selection is performed, the selection triggers an innovative recommendation algorithm, where the selected entity types are passed in as the context. The algorithm calculates the affinities of the entity types and the available user interface (UI) components related to the data selected, based on the tags attached to the UI components. As the result of the calculation, a set of recommended visualization (Log viewer, 3D/2D canvas, BI dashboards etc.) and workflow (Machine learning, data QC etc.) components is presented to the users. Users can choose to open a visualization component that is best suited for the data.

Figure 6:
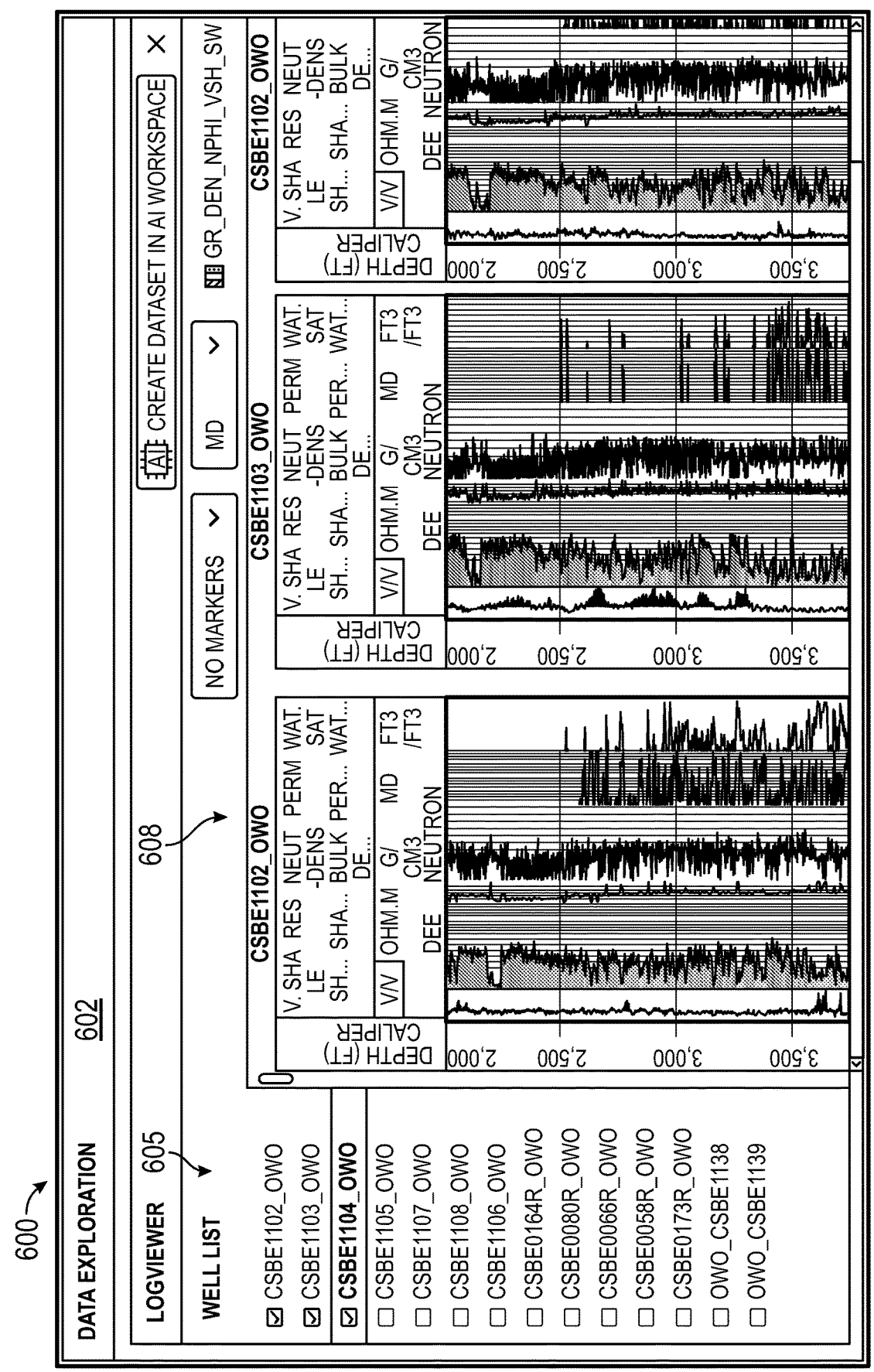
FIG. 6 shows a diagram for data quality control (QC) using a visualization component for a specific data type in accordance with one or more embodiments of the disclosure.

Turning to FIG. 6, the user interface (600) may be displayed to a user. FIG. 6 shows a diagram of a user interface for data quality control (QC) using a visualization component for a specific data type. Further quality control or analysis can be performed on the data before the data is used in the machine learning process (such as shown in FIG. 7).

For example, the user interface (600) includes the log viewer (602). The log viewer (602) displays the list (605) of wells that correspond to a location identified from a map view (see FIG. 5). Check boxes allow for the selection of data from one or more wells. Three wells are selected and the data for the three well is shown in the window (608).

The window (608) displays data selected from the list (605) that corresponds to data from a data location selected from a map view (see FIG. 5). The window (608) presents the data in a manner that the user may scroll through and view the data.

Figure 7:
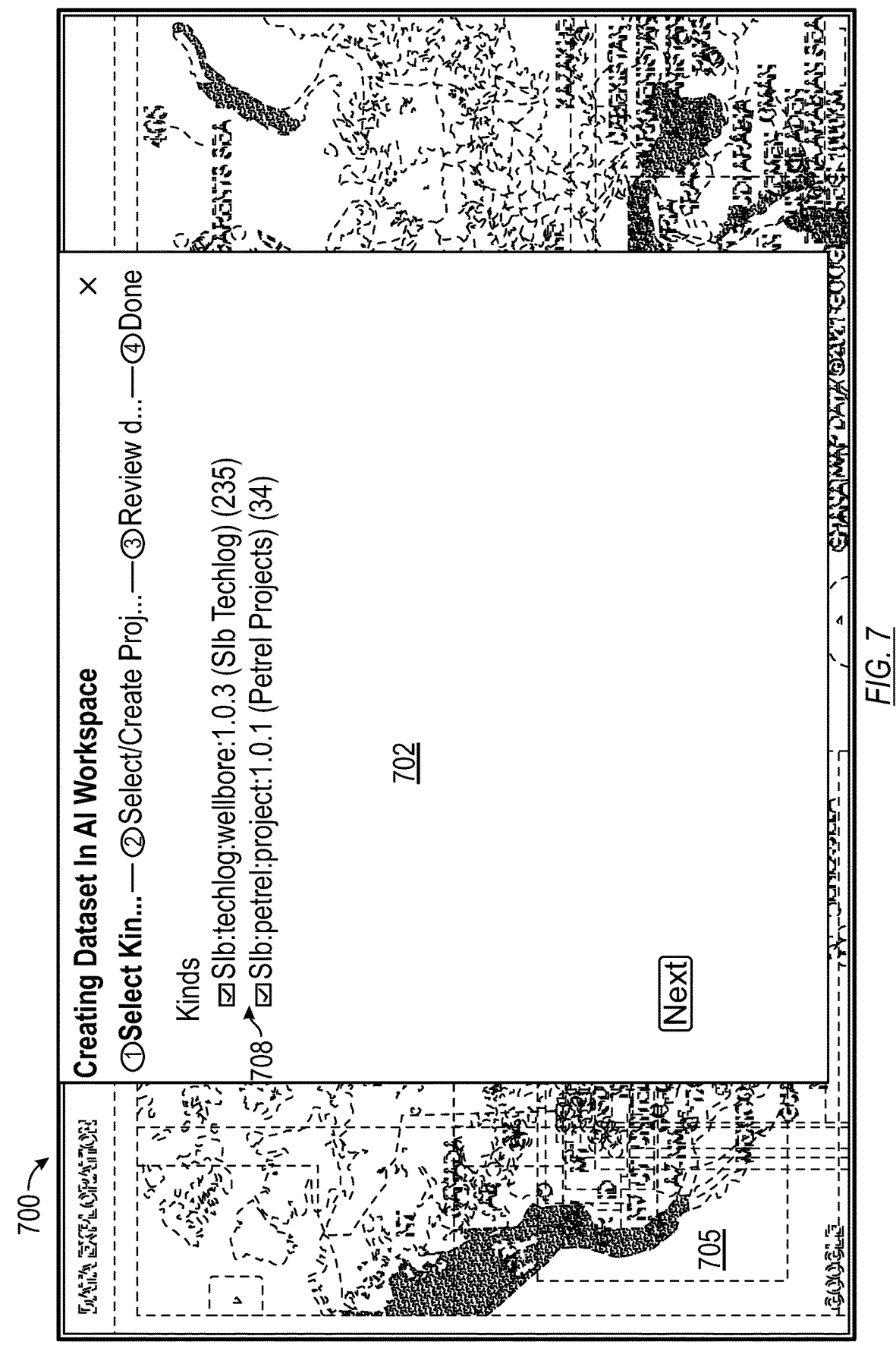
FIG. 7 shows a diagram for a workflow component triggered from data discovery workflow in accordance with one or more embodiments of the disclosure.

Turning to FIG. 7, the user interface (700) is updated to display the window (702) of a workflow component on top of the map view (705). FIG. 7 shows a diagram for the workflow component triggered from data discovery workflow (i.e., from the map view (705)). Users can select one of the workflow components, such as machine learning, which triggers the workflow of creating a machine learning process, with the selected datasets being included in the project (e.g., as shown in FIG. 7). The workflow of the window (702) provides for the selection of a type of project (e.g., using the check boxes (708)). Once the project is created, the project will have the data (e.g., the well sites selected from FIG. 6) automatically imported into the project. Relevant workflow components are connected through a common data platform (e.g., one of the platforms (308) of FIG. 3). This enables the data discovery to be able to notify the requirements of data to the machine learning component, which further executes the data import and load. In one embodiment, The data is imported into the project by constructing a suitable dataset and calling an internal application programming interface (API).

Users generally can connect to datasets using data connectors and use different graphical plots and statistics tools to manipulate the data. Finding data can be a challenge. One or more embodiments described herein provides a unique approach to discover quality control and analyze the data at higher level, and yet unleash the capability to dive deep via the best breed of visualization tools uniquely designed for energy data. One or more embodiments are directed to visualizations specific to energy data analytics, along with the ability to identify the datasets to be used for the learning has not been part of the offering.

One or more embodiments are directed to software for data scientists to embrace the full benefits of machine learning without an integrated and cohesive platform for data discovery, data visualization and data science.

Data mining is a difficult task involving requests for a data management expert with IT (information technology) skills. Energy data, including oil and gas data, may be very specific with respect to having more geospatial requests and data specific visualizations. One or more embodiments addresses the constant challenges facing the data scientists working on generating insight into the energy data by providing easy to use data exploration and discovery tools. One or more embodiments also bridges the gap of the end-to-end data science workflow between data and machine learning process.

One or more embodiments further can be integrated in other applications such as a low-code environment to create sophisticated applications on top of oil & gas data platform. It can also be used to address common concerns in IOT (internet of things) based products.

Traditionally, data scientists in the E&P (exploration and production) industry resort to tools such as database queries, tables and files in order to find the data that can be used to create machine learning models. The process is lengthy, inefficient and error-prone.

One or more embodiments provide a low-code environment with user friendly interface. It changes existing silos of data mining, replacing it with intuitive visual tools and workflows. The integration of the business intelligence with the machine learning creates an enhanced journey for data scientists.

One or more embodiments decrease amount of time by data scientists. One or more embodiments provide an easy to use interface for data scientists. One or more embodiments provide data visualization in the process of generating insight through machine learning. Further, one or more embodiments provide an integrated platform for data scientists in energy industry.

One or more embodiments integrate data discover into machine learning using tools and workflows. One or more embodiments also integrates tightly with the underlying energy data sources and provides different visualization tools specific for energy data types.

As part of the machine learning workflow, one or more embodiments facilitate the process of data discovery and provide tools for data quality control, prior to the data wrangling process. One or more embodiments may also be used partially in other data management workflows.

One or more embodiment enhance the machine learning pipeline by providing additional tools to discovery the energy data suitable for machine learning easily. One or more embodiments integrate with energy data sources, with overview of entire datasets. Further, one or more embodiments provide a smart recommendation algorithm to drill down to details of data, with specific visualization component for each kind.

One or more embodiments provide efficiency gain by providing an integrated environment to find the data inside the data platform through geospatial tool, 2D/3D visualization and BI (business intelligence) dashboards. One or more embodiments democratize data science by providing and intuitive low code environment for data exploration.

Embodiments of the disclosure may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 8.1, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities that implement the features and elements of the disclosure.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (800) in FIG. 8.1 may be connected to or be a part of a network. For example, as shown in FIG. 8.2, the network (820) may include multiple nodes (e.g., node X (822), node Y (824)). Each node may correspond to a computing system, such as the computing system shown in FIG. 8.1, or a group of nodes combined may correspond to the computing system shown in FIG. 8.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (800) may be located at a remote location and connected to the other elements over a network.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8.1. Further, the client device (826) may include and/or perform all or a portion of one or more embodiments of the invention.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

The computing system in FIG. 8.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g., join, full join, count, average, etc.), sorts (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8.1 may include functionality to present raw and/or processed data, such as results of comparisons and other processing. For example, presenting data may be accomplished through various presenting methods. Specifically, data may be presented through a user interface provided by a computing device. The user interface may include a graphical user interface (GUI) that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

The above description of functions presents only a few examples of functions performed by the computing system of FIG. 8.1 and the nodes and/or client device in FIG. 8.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
presenting a map view displaying a plurality of data locations;
receiving a selection identifying a subset of the map view;
selecting a plurality of application components corresponding to the data locations from the subset of the map view;
updating, responsive to selecting the plurality of application components, a toolbar displayed on the map view to include a plurality of icons corresponding to the plurality of application components;
presenting a visualization component, of the plurality of application components;
creating, using a workflow component of the plurality of application components, a project workspace, wherein the data presented with the visualization component is automatically imported to the project workspace, and wherein the workflow component comprises a machine learning component;
triggering a recommendation algorithm configured to recommend a set of visualizations and workflow components based on the selection and user interface components; and
displaying the set of recommended visualization and workflow components.

2. The method of claim 1, further comprising:
receiving the selection from the map view in response to a selection tool comprising one of a lasso select tool and a rectangular select tool.

3. The method of claim 1, wherein the project workspace is configured to train and execute a machine learning model using the data presented with a domain view and the map view.

4. The method of claim 1, further comprising:
presenting the plurality of data locations as a layer of the map view.

5. The method of claim 1, further comprising:
updating the plurality of icons of the toolbar to include an icon of the workflow component.

6. The method of claim 1, further comprising:
updating the plurality of icons of the toolbar to include an icon of a dashboard.

7. The method of claim 1, further comprising:
selecting a portion of the data using the visualization component.

8. The method of claim 1, further comprising:
executing the workflow component in response to selection of a button presented with the visualization component.

9. The method of claim 1, wherein the visualization component comprises one of a two-dimensional viewer, a three-dimensional viewer, and a log viewer.

10. The method of claim 1, further comprising:
creating the project workspace by updating a source code file to identify the data.

11. A system comprising:
a processing system comprising one or more processors;
a memory storing instructions that, when executed by the processing system, are configured to cause the processing system to perform one or more operations comprising:
developing a map view configured to display a plurality of data locations;
executing:
a plurality of application components; and
a server application configured for:
presenting the map view displaying the plurality of data locations;
receiving a selection identifying a subset of the map view;
selecting the plurality of application components corresponding to the data locations from the subset of the map view;
updating, responsive to selecting the plurality of application components, a toolbar displayed on the map view to include a plurality of icons corresponding to the plurality of application components;
presenting a visualization component, of the plurality of application components;
creating, using a workflow component of the plurality of application components, a project workspace, wherein the data presented with the visualization component is automatically imported to the project workspace, and wherein the workflow component comprises a machine learning component;
triggering a recommendation algorithm configured to recommend a set of visualization and workflow components based on the selection and user interface components; and
displaying the set of recommended visualization and workflow components.

12. The system of claim 11, wherein the server application is further configured for:
receiving the selection from the map view in response to a selection tool comprising one of a lasso select tool and a rectangular select tool.

13. The system of claim 11, wherein the project workspace is configured to train and execute a machine learning model using the data presented with the domain view and the map view.

14. The system of claim 11, wherein the server application is further configured for:
presenting the plurality of data locations as a layer of the map view.

15. The system of claim 11, wherein the server application is further configured for:
updating the plurality of icons of the toolbar to include an icon of the workflow component.

16. The system of claim 11, wherein the server application is further configured for:
updating the plurality of icons of the toolbar to include an icon of a dashboard.

17. The system of claim 11, wherein the server application is further configured for:
selecting a portion of the data using the visualization component.

18. The system of claim 11, wherein the server application is further configured for:
executing the workflow component in response to selection of a button presented with the visualization component.

19. The system of claim 11, wherein the visualization component comprises one of a two-dimensional viewer, a three-dimensional viewer, and a log viewer.

20. A method comprising:
displaying, on a user interface, a map view with a plurality of data locations;
receiving a selection identifying a subset of the map view;

updating a toolbar displayed on the map view to include a plurality of icons of a plurality of application components configured to use data identified with the selection of the subset of the map view;

presenting, on the user interface, a visualization component, of the plurality of application components;

creating, using a workflow component of the plurality of application components, a project workspace, wherein the data displayed with the visualization component and the map view is automatically imported to the project workspace, and wherein the workflow component comprises a machine learning component;

triggering a recommendation algorithm configured to recommend a set of visualization and workflow components based on the selection and user interface components; and displaying the set of recommended visualization and workflow components.

* * * * *